(12) United States Patent
Hong et al.

(10) Patent No.: US 12,510,938 B2
(45) Date of Patent: Dec. 30, 2025

(54) HINGE DEVICE OF PORTABLE TERMINAL HAVING FOLDABLE STRUCTURE

(71) Applicant: FINE M-TEC CO., LTD., Anyang-si (KR)

(72) Inventors: Sung Chun Hong, Seoul (KR); Hyun Taek Jung, Seoul (KR); Chang Soo Kim, Incheon (KR)

(73) Assignee: FINE M-TEC CO., LTD., Anyang-si (KR)

( * ) Notice: Subject to any disclaimer, the term of this patent is extended or adjusted under 35 U.S.C. 154(b) by 250 days.

(21) Appl. No.: 18/567,834

(22) PCT Filed: Jun. 22, 2022

(86) PCT No.: PCT/KR2022/008880
§ 371 (c)(1),
(2) Date: May 15, 2024

(87) PCT Pub. No.: WO2022/270906
PCT Pub. Date: Dec. 29, 2022

(65) Prior Publication Data
US 2025/0028368 A1 Jan. 23, 2025

(30) Foreign Application Priority Data
Jun. 23, 2021 (KR) .................. 10-2021-0081486

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)

(58) Field of Classification Search
CPC ...................................................... G06F 1/16
See application file for complete search history.

(56) References Cited

U.S. PATENT DOCUMENTS

2015/0327383 A1* 11/2015 Hsu .................. G06F 1/1616
16/366
2019/0112852 A1* 4/2019 Hsu .................. G06F 1/1618

FOREIGN PATENT DOCUMENTS

JP          2020125841 A    8/2020
JP          2021093030 A    6/2021
(Continued)

*Primary Examiner* — Jerry Wu
(74) *Attorney, Agent, or Firm* — NKL Law; Jae Youn Kim

(57) ABSTRACT

A hinge device of a portable terminal having a foldable structure, according to the present invention, comprises: a housing positioned between one-end portions of a first body and a second body; a first hinge blade and a second hinge blade fixed to the first body and the second body and rotationally supported on the housing to perform rotation movement as much as a predetermined angle between an 'unfolded position' at which the first body and the second body are placed on the same horizontal line and a 'folded position' at which the first body and the second body are facing and in contact with each other; and a slide member for interlocking the first hinge blade and the second hinge blade to perform a relative motion, wherein a first inclined guide protrusion and a second inclined guide protrusion are formed on bottom surfaces of the first hinge blade and the second hinge blade, a first inclined guide groove and a second inclined guide groove are formed on a top surface of the slide member in correspondence thereto, and the slide member is installed in the housing to reciprocate a predetermined distance in a direction of hinge axis line.

13 Claims, 15 Drawing Sheets

(56) References Cited

FOREIGN PATENT DOCUMENTS

| KR | 10-2019-0097898 A | 8/2019 |
|---|---|---|
| KR | 10-2019-0124110 A | 11/2019 |
| KR | 10-2020-0011100 A | 2/2020 |
| KR | 10-2020-0101241 A | 8/2020 |
| KR | 20210011737 A | 2/2021 |
| KR | 10-2021-0068880 A | 6/2021 |

\* cited by examiner

HINGE DEVICE OF PORTABLE TERMINAL HAVING FOLDABLE STRUCTURE

TECHNICAL FIELD

The present invention relates to a portable terminal hinge device having a foldable structure, and particularly, to a portable terminal hinge device having a foldable structure, which is installed in a portable terminal equipped with a display and improved to stably fold and unfold the display.

BACKGROUND ART

A portable terminal includes any device that has a battery and a display unit, outputs information to the display unit using power supplied from the battery, and is formed to be carried by a user.

The portable terminal comprises a device that records and plays back videos and a device that displays a graphic user interface (GUI), and includes notebook computers, cellular phones, glasses and watches capable of displaying screen information, game consoles, and the like.

As the functions of the portable terminals like this are diversified, the portable terminals are implemented in the form of a multimedia device (multimedia player) having complex functions such as photographing pictures or videos, playing back music or video files, playing games, receiving broadcasts, and the like.

In order to support and increase the functions of the portable terminals, improving structural and/or software parts of the portable terminal may be considered.

In addition, portable terminals are evolving into various types of designs, and efforts are made to develop the portable terminals into newer types in order to meet the needs of users who desire designs of newer and more diverse types.

Here, the new types include structural changes and improvements for users to use the portable terminals more conveniently.

As one of the structural changes and improvements, portable terminals of which at least a portion of a display unit is flexible or bendable are attracting attention.

However, in order to implement the flexible or bendable portable terminals, a complicated configuration is required to provide power or transfer external force, and this has a disadvantage of complicating the appearance or increasing thickness of the portable terminals.

In addition, as a change occurs in the length when the display is folded, hinge devices used in the conventional folder portable terminals may not be used.

In addition, most of the conventional hinge structures applied to display panels configure an interlocking structure that makes a relative motion of two bodies with each other by simply using gears engaged in the rotation direction of bodies (Korean Patent Publication No. 10-2019-0124110). However, the interlocking structure has a problem of lowering durability, generating vibration or noise, making the manufacturing process complicated, and increasing the unit cost of parts.

Accordingly, it urgently needs to develop a portable terminal hinge having an efficient folding structure of a new type, which can manage the change in the length while allowing both ends of the display to be uniformly folded at the same angle.

DISCLOSURE OF INVENTION

Technical Problem

Therefore, the present invention has been made in view of the above problems, and it is an object of the present invention to provide a new hinge device for folding-type portable terminals, which can improve durability, reduce vibration or noise, simplify the manufacturing process, and reduce unit cost of parts.

Technical Solution

To accomplish the above object, according to one aspect of the present invention, there is provided a hinge device comprising: a housing positioned between one-end portions of a first body and a second body; a first hinge blade and a second hinge blade fixed to the first body and the second body and rotationally supported on the housing to perform rotation movement as much as a predetermined angle between an 'unfolded position' at which the first body and the second body are placed on the same horizontal line and a 'folded position' at which the first body and the second body are facing and in contact with each other; and a slide member for interlocking the first hinge blade and the second hinge blade to perform a relative motion, wherein a first inclined guide protrusion and a second inclined guide protrusion are formed on bottom surfaces of the first hinge blade and the second hinge blade, a first inclined guide groove and a second inclined guide groove are formed on a top surface of the slide member in correspondence thereto, and the slide member is installed in the housing to reciprocate a predetermined distance in a direction of hinge axis line.

In addition, in the present invention, the first inclined guide groove and the second inclined guide groove are formed inclinedly in a direction crossing each other with respect to the moving direction of the slide member.

In addition, in the present invention, tilted angles of the first inclined guide groove and the second inclined guide groove are the same on the basis of a moving axis line of the slide member.

In addition, in the present invention, the first inclined guide groove and the second inclined guide groove are configured as a curved surface formed in a rotation direction along a length.

In addition, in the present invention, the portions where the first inclined guide protrusion and the second inclined guide protrusion are formed are configured as a curved surface formed in a rotation direction.

In addition, in the present invention, a rectangular slide slot is formed in the housing in a moving direction of the slide member, and a slide protrusion inserted and guided in the slide slot is formed on the slide member.

In addition, in the present invention, the first inclined guide protrusion and the second inclined guide protrusion are formed in a shape of which a width decreases toward a top.

In addition, in the present invention, the first inclined guide protrusion and the second inclined guide protrusion are formed in a rectangular shape in a length direction of the first inclined guide groove and the second inclined guide groove.

In addition, in the present invention, the first inclined guide protrusion and the second inclined guide protrusion are formed in a hemispherical shape.

In addition, in the present invention, the hinge device is rotationally supported by configuring a pair of semicircular protrusions formed on both inner walls of the housing, and semicircular grooves formed on the first and second hinge blades, into which the semicircular protrusions are insert-fitted to be rotationally supported.

In addition, in the present invention, the pair of semicircular protrusions are formed to be spaced a predetermined distance apart to accommodate a predetermined radius of curvature formed in a folding portion of a flexible display panel at the 'folding position'.

In addition, the hinge device according to the present invention further comprises a tension mechanism comprising: a tension fixed member having a first guide shaft and a second guide shaft in a direction of hinge axis line; a first tension blade and a second tension blade installed to be inserted into the first guide shaft and the second guide shaft to be rotationally supported and to be movable in an axis direction; tension operating members installed to be inserted into the first guide shaft and the second guide shaft to be movable in the axis direction; and a spring that provides elastic force to the tension operating member.

In addition, in the present invention, the tension mechanism includes a plurality of inclined protrusions formed in the tension operating members in a circumferential direction around the first guide shaft and the second guide shaft, and another plurality of inclined protrusions formed in the first tension blade and the second tension blade to be insert-fitted in correspondence to the inclined protrusions.

In addition, in the present invention, the tension mechanism includes a tension guide protrusion provided in each of the first tension blade and the second tension blade, wherein the tension guide protrusion is inserted and guided in a rectangular tension guide hole formed on one side of each of the first and second hinge blades.

In addition, in the present invention, the tension mechanism further includes a spring elastically installed at an interlocking portion located farthest from the rotation axis line of the first and second tension blades, between the interlocking portions of the first and second hinge blades and the first and second tension blades.

Advantageous Effects

According to the present invention, as the hinge structure interlocking the bodies is interlocked with a slide member that reciprocates linearly in the direction of hinge axis line of the bodies during the folding operation, vibration and noise can be reduced by minimizing the load and gap during the folding operation, and as the interlocking structure is simplified, there is an effect of improving durability, reducing the cost of parts, and simplifying the manufacturing process.

In addition, as a tension mechanism that interlocks when the hinge blades rotate is provided, there is an effect of distributing the load on the hinge blades and preventing damage generated due to high load, and further reducing generation of vibration and noise during rotation by decreasing the gap.

DESCRIPTION OF SYMBOLS

Figure 1:
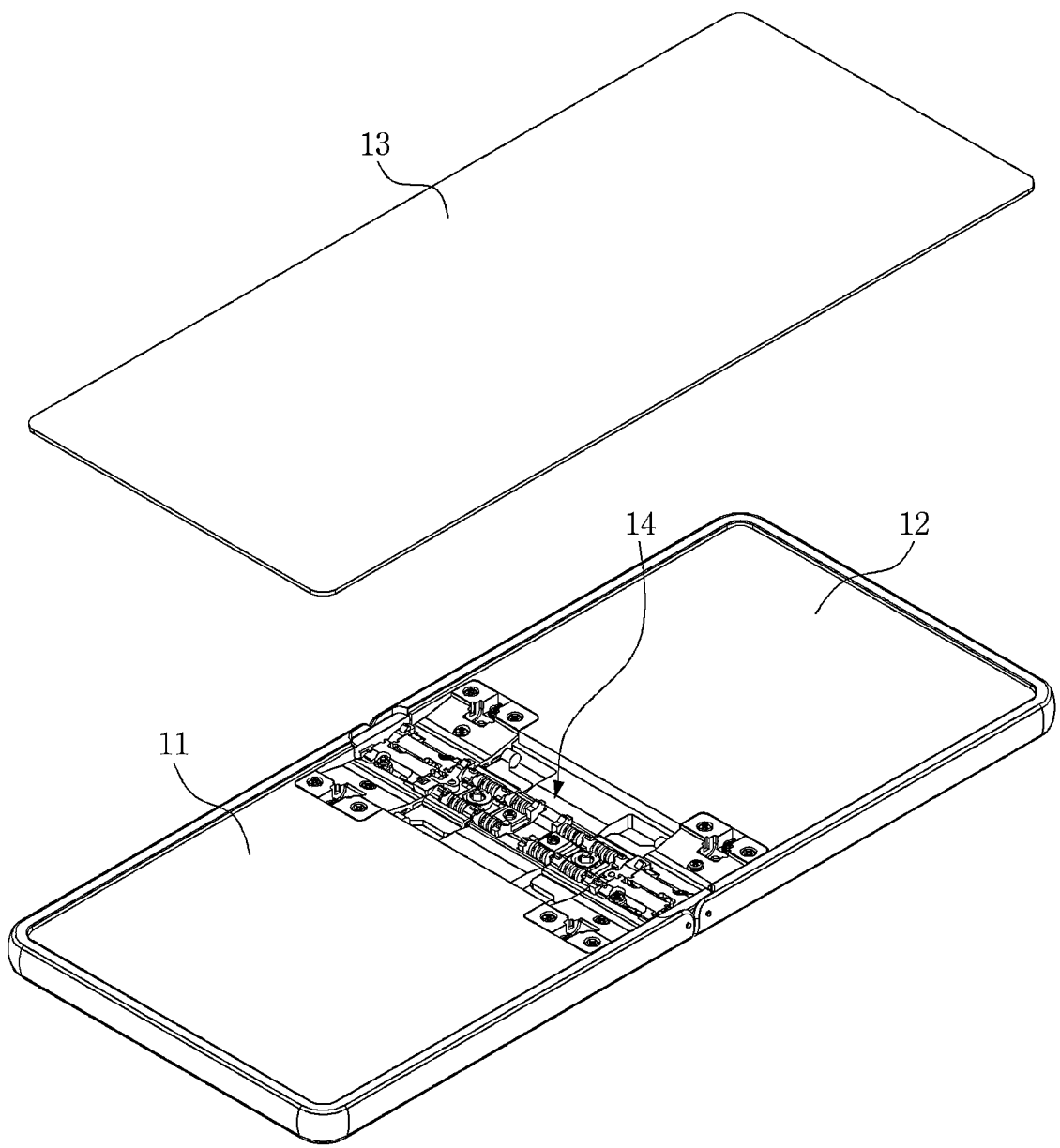
FIG. 1 is a perspective view showing a flexible display panel separated from first and second bodies at an unfolded position of a portable terminal according to an embodiment of the present invention.

| | |
|---|---|
| 11, 12: First and second bodies | 13: Flexible display panel |
| 14: Hinge device | 21, 22: First and second hinge blades |
| 31: Housing | 41: Slide member |
| 43a, 43b: First and second inclined guide protrusions | |
| 44a, 44b: First and second inclined guide grooves | |
| 50: Tension mechanism | 55, 56: First and second tension wings |

BEST MODE FOR CARRYING OUT THE INVENTION

The detailed description of the present invention is described below with reference to the accompanying drawings, which shows, as an example, specific embodiments in which the present invention may be embodied. These embodiments are described in detail as sufficient as to embody the present invention by those skilled in the art. It should be understood that although the various embodiments of the present invention are different from one another, they are not necessarily mutually exclusive. For example, specific shapes, structures and characteristics described herein may be implemented in other embodiments without departing from the spirit and scope of the present invention in relation to an embodiment. In addition, it should be understood that the location or arrangement of individual components within each disclosed embodiment may be changed without departing from the spirit and scope of the present invention. Accordingly, the detailed description described below is not intended to be taken in a limiting sense, and the scope of the present invention, if properly described, includes all equivalents as claimed in the claims. In the drawings, similar reference numerals refer to identical or similar functions across several aspects.

Hereinafter, preferred embodiments of the present invention will be described in detail with reference to the accompanying drawings.

FIG. 1 is a perspective view showing a flexible display panel 13 separated from first and second bodies 11 and 12 at an unfolded position of a portable terminal according to an embodiment of the present invention, and a hinge device 14 is installed to be connected between one-end portions where the folding portions of the first body 11 and the second body 12 face each other.

The flexible display panel 13 is formed in a size that may cover the entire area of the first and second bodies 11 and 12 including the hinge device 14, and is fixed to the inner surface of the bodies 11 and 12, excluding the hinge device 14, with an attachment means such as an adhesive or the like.

Figure 2:
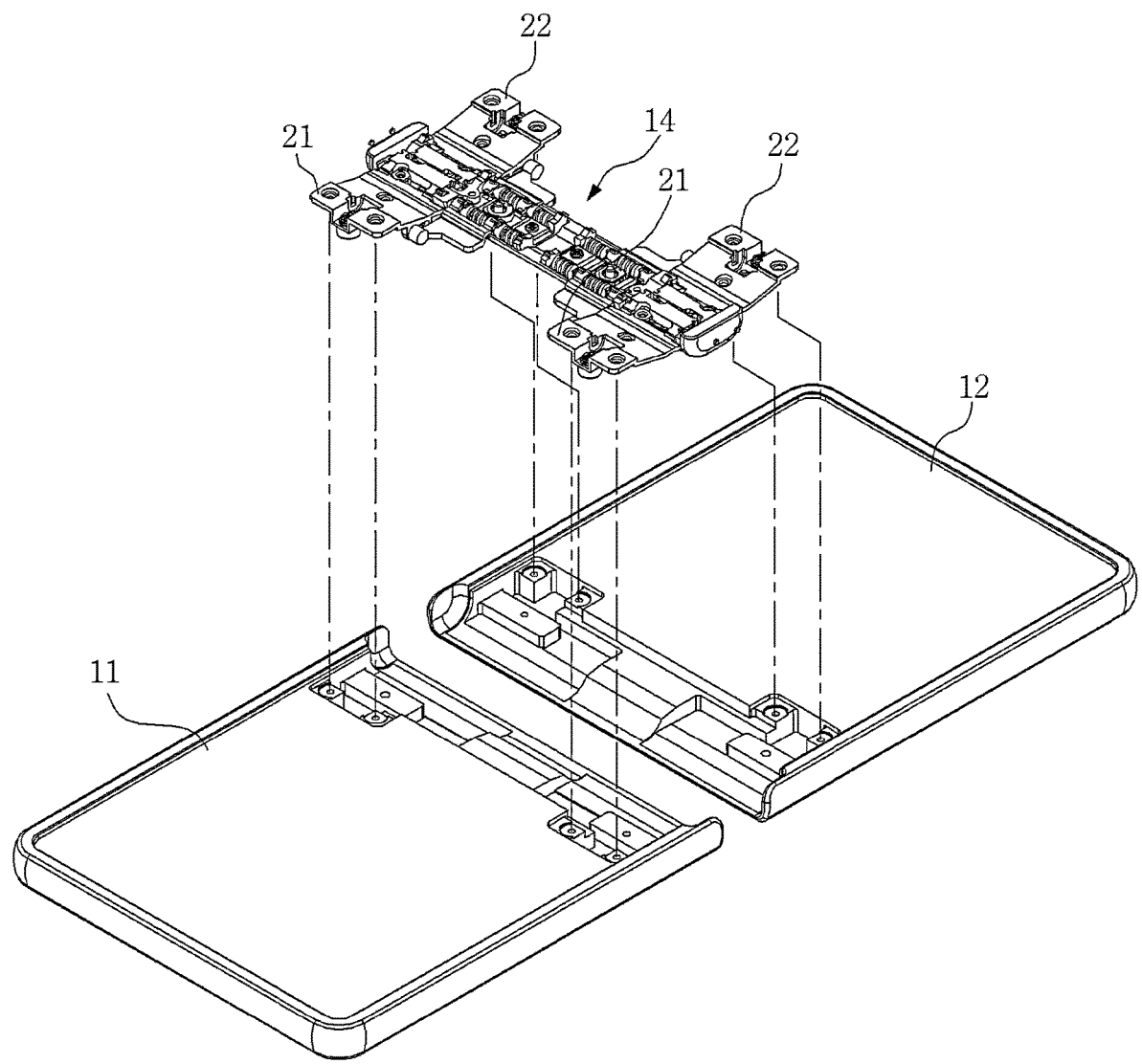
FIG. 2 is an exploded perspective view showing the connection relation between the first and second bodies and the hinge device in FIG. 1.

FIG. 2 is an exploded perspective view showing the connection relation between the first and second bodies 11 and 12 and the hinge device 14 in FIG. 1. The hinge device 14 has first and second hinge blades 21 and 22, and the hinge device 14 is coupled to the first and second bodies 11 and 12 by fixing the first and second hinge blades 21 and 22 to the first body 11 and the second body 12 using screws (not shown).

Figure 3:
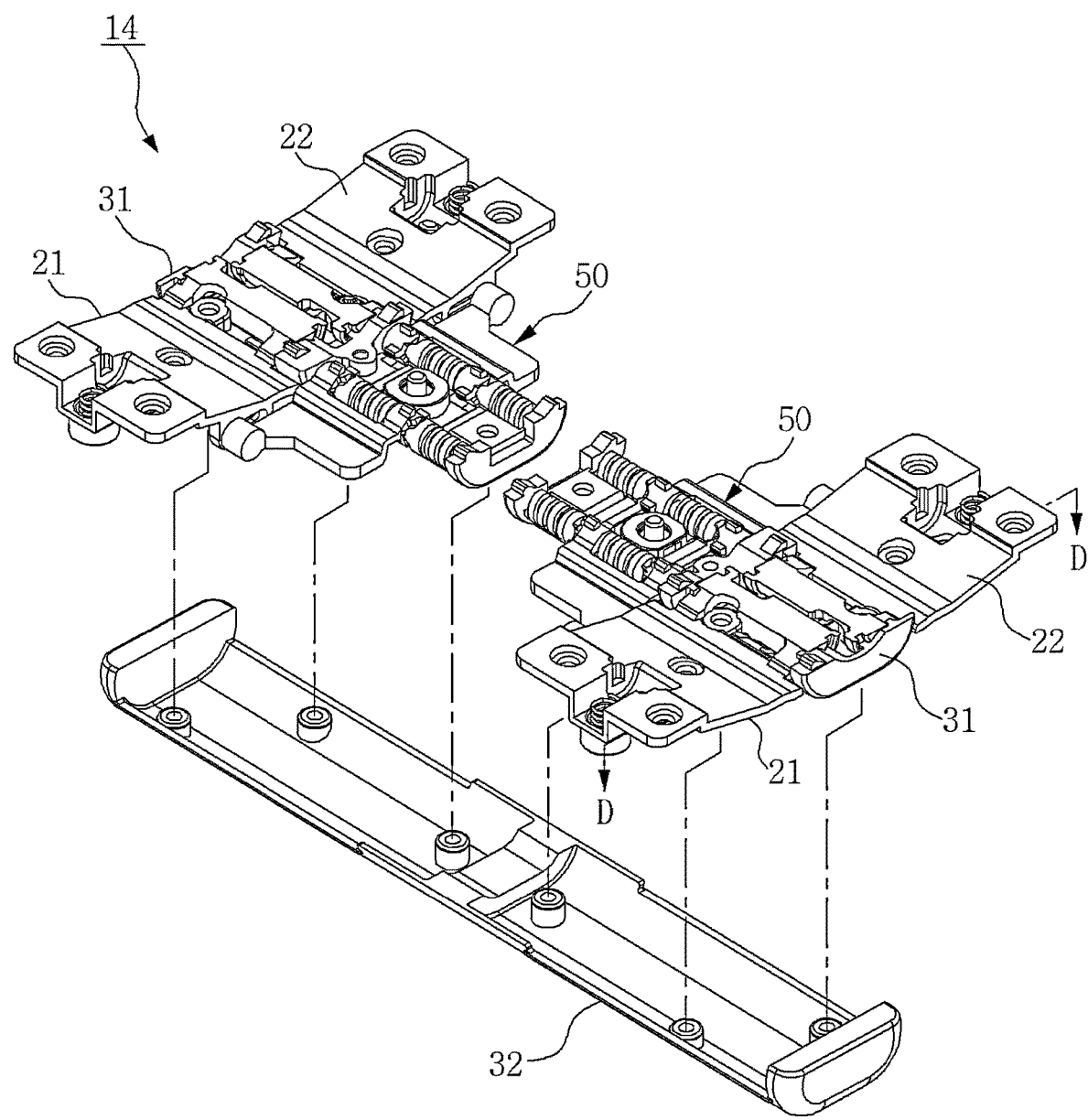
FIG. 3 is a perspective view showing disassembled major components of a hinge device according to an embodiment of the present invention in isolation.

FIG. 3 is a perspective view showing disassembled major components of a hinge device 14. As shown in the figure, the hinge device 14 includes a housing 31 for supporting the first and second hinge blades 21 and 22 to rotate as much as a predetermined angle, i.e., between the 'unfolded position' and the 'folded position' of the first and second bodies 11 and 12, and a tension mechanism 50 for performing a free stop function between the 'unfolded position' and the 'folded position' during the rotation movement of the first and second hinge blades 21 and 22.

The first and second hinge blades 21 and 22, the housing 31, and the tension mechanism 50 are installed at both ends of the connection end portions of the first and second bodies 11 and 12 in the same configuration for the sake of stable folding of the first and second bodies 11 and 12, and the housings 31 and the tension mechanisms 50 on both sides are fixed to a hinge cover 32 using screws (not shown).

Figure 4:
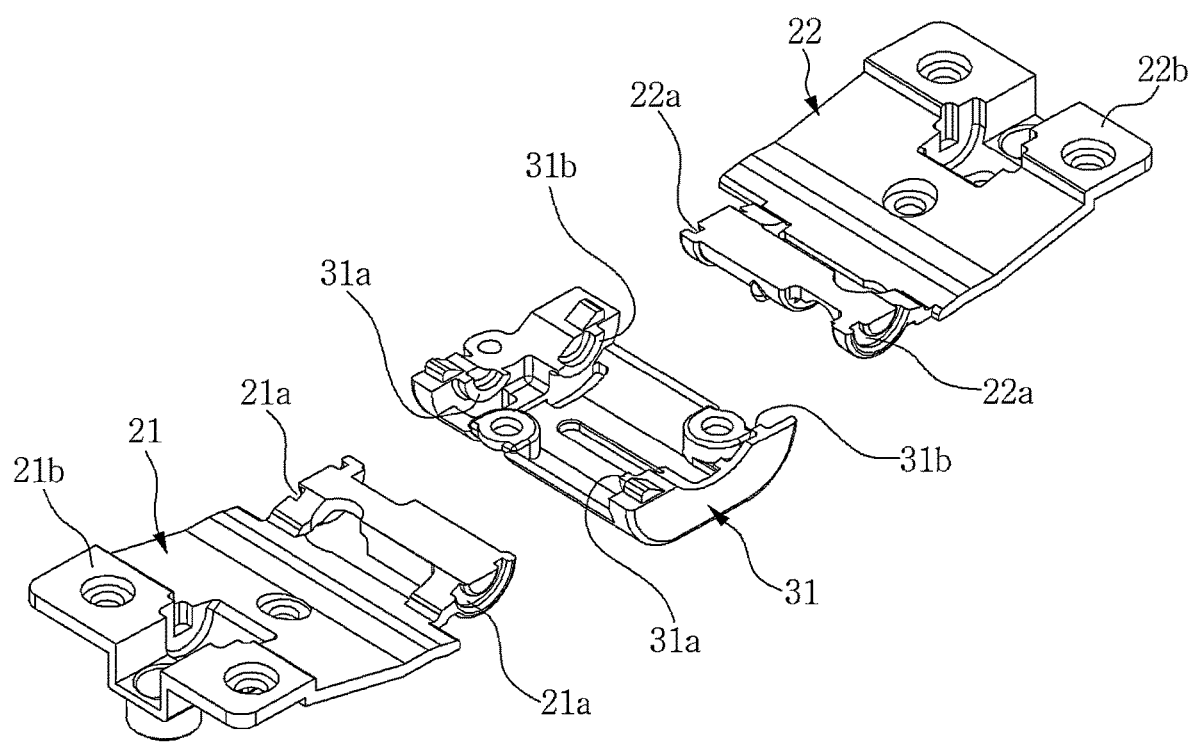
FIG. 4 is an exploded perspective view showing the first and second hinge blades and the housing, which shows the rotation support configuration of the first and second hinge blades in a hinge device according to an embodiment of the present invention.
Figure 5A:
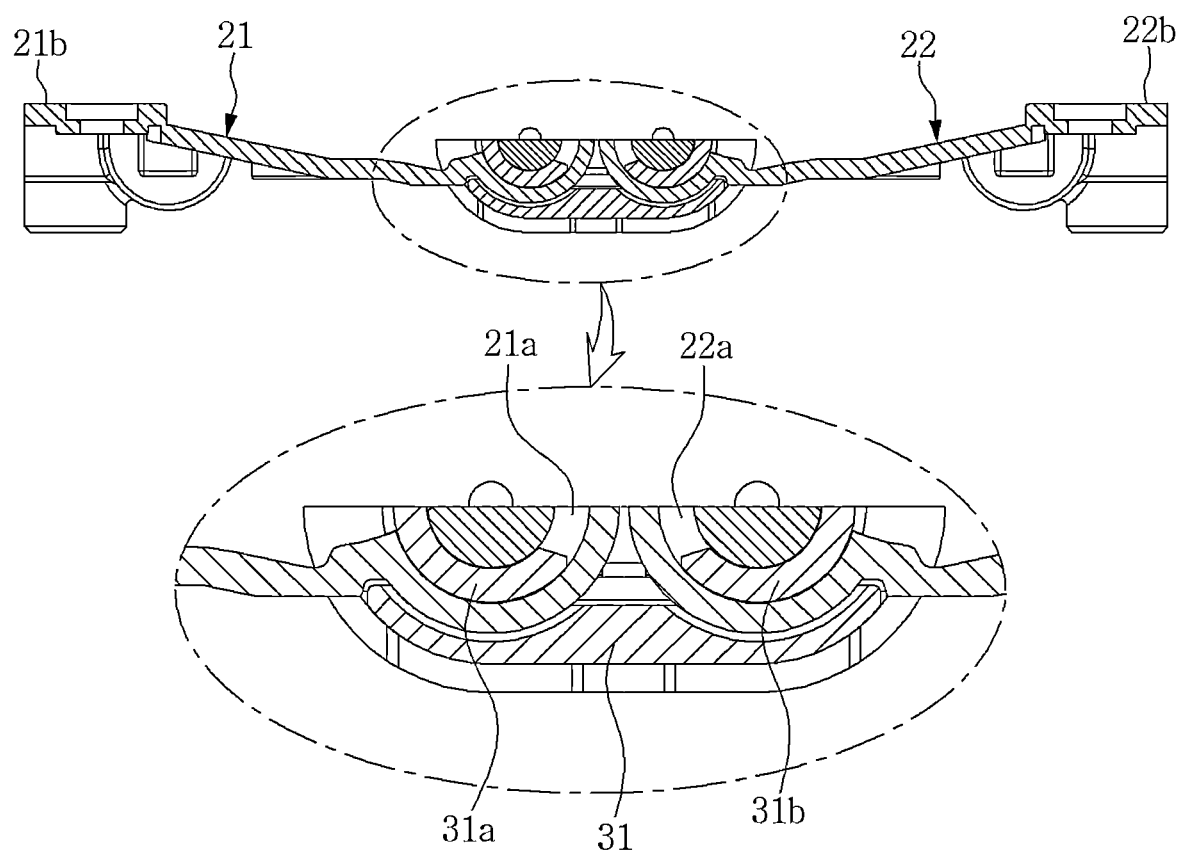
FIGS. 5a and 5b are cross-sectional views taken along the line D-D in FIG. 3, showing the rotation support configuration of the first and second hinge blades shown in FIG. 4.
Figure 5B:
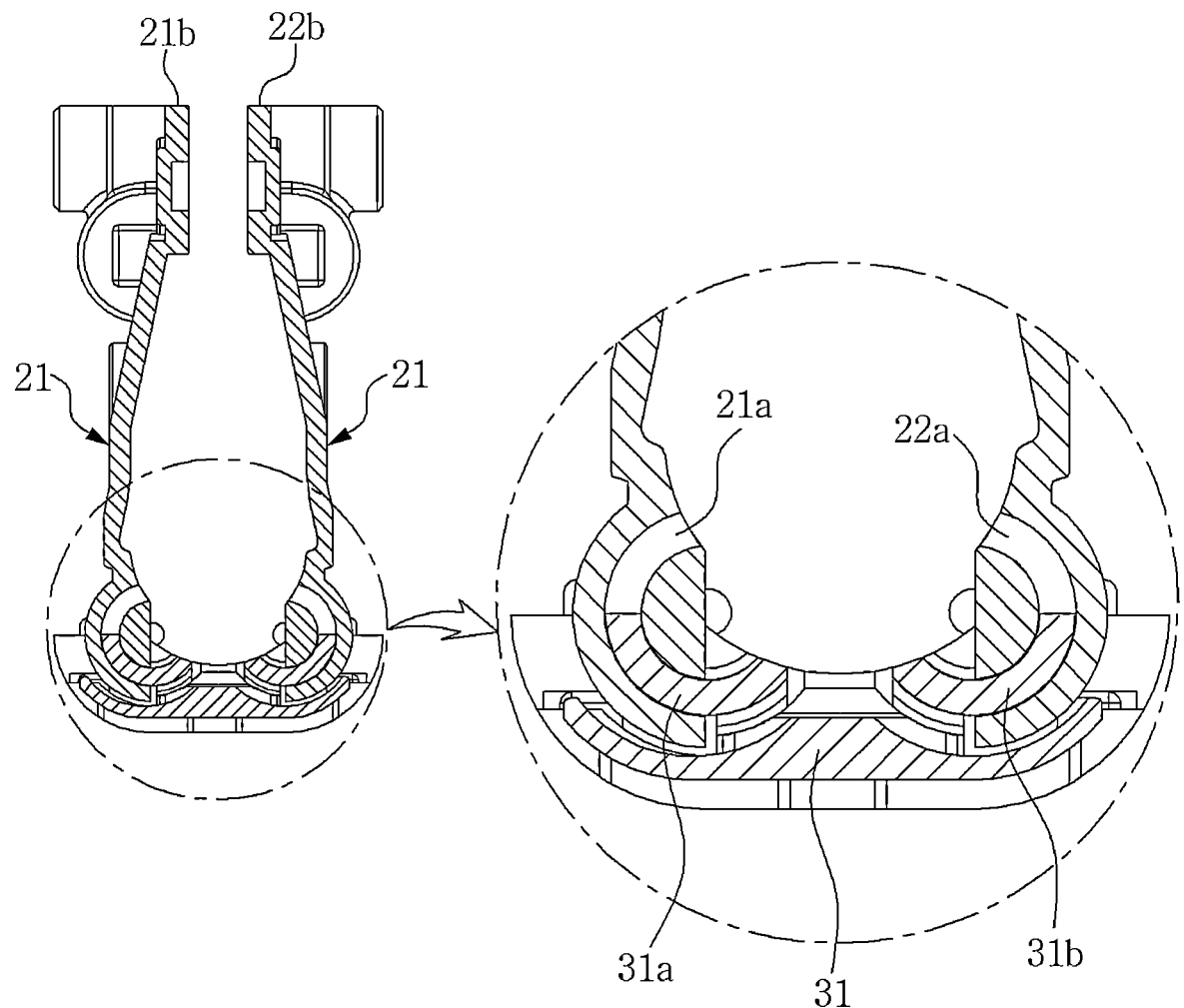

FIGS. 4, 5a and 5b show the rotation support configuration of the first and second hinge blades 21 and 22 in the hinge device 14 of the present invention. Although FIGS. 5a and 5b are cross-sectional views taken along the line D-D in FIG. 3, they are shown as major configurations to easily explain the rotation support configuration of the first and second hinge blades 21 and 22 shown in FIG. 4. As shown in the figure, the rotation support configuration of the first and second hinge blades 21 and 22 includes a pair of semicircular protrusions 31a and 31b formed on both inner walls of the housing 31 to be spaced a predetermined distance apart, and semicircular grooves 21a and 22a formed on the first and second hinge blades 21 and 22, into which the semicircular protrusions 31a and 31b are insert-fitted to be rotationally supported.

As the semicircular grooves 21a and 22a of the first and second hinge blades 21 and 22 are formed at the opposite ends of the fixing units 21b and 22b to which the first and second bodies 11 and 12 are fixed so that the fixing units 21b and 22b sides may rotate as much as a predetermined angle around the semicircular grooves 21a and 22a, the first and second bodies 11 and 12 may rotationally support between the 'unfolded position' and the 'folded position'.

At this point, the distance between the semicircular protrusions 31a and 31b is set so that a folding space may be formed between the first and second hinge blades 21 and 22 to accommodate a predetermined radius of curvature formed in the folding portion of the flexible display panel 13 at the 'folded position'.

Although it is described as an example in this embodiment that the semicircular grooves 21a and 22a are formed on the first and second hinge blades 21 and 22, and the semicircular protrusions 31a and 31b are formed on the housing 31, contrarily, the semicircular protrusions 31a and 31b may be formed on the first and second hinge blades 21 and 22, and semicircular grooves 21a and 22a may be formed on the housing 31.

Although an embodiment of the rotation support configuration of the hinge blades 21 and 22 has been described above, any configuration that can rotationally support the bodies 11 and 12 may be applied to the present invention in combination with the interlocking means described below.

Figure 6:
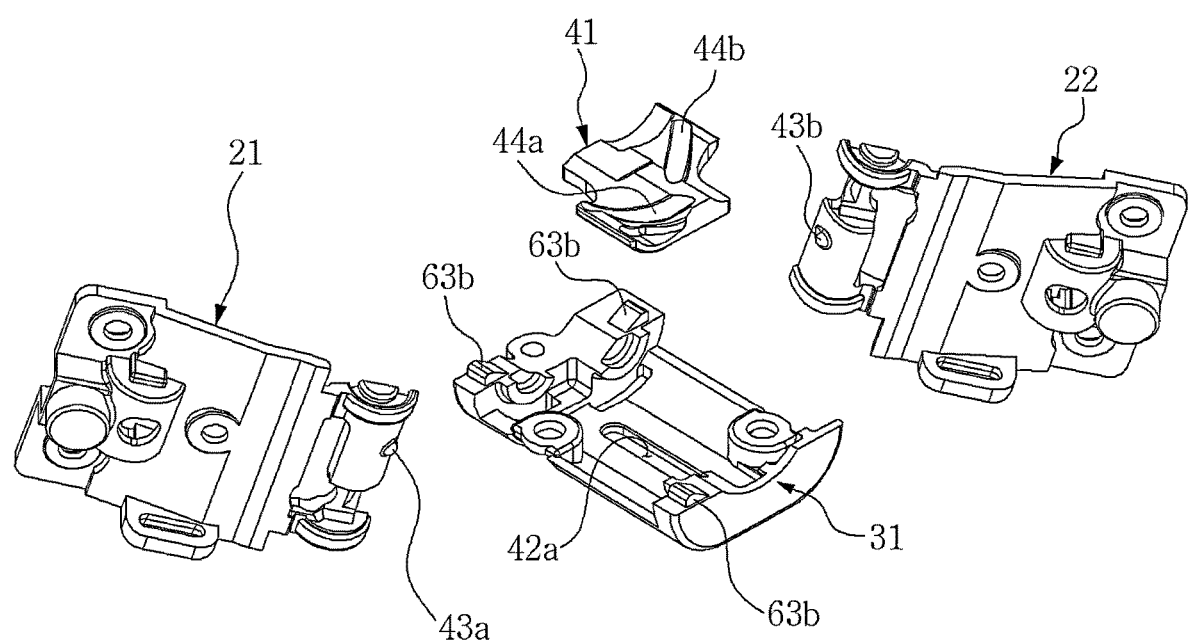
FIG. 6 is an exploded perspective view showing the interlocking structure of the first and second hinge blades and the slide member in a hinge device according to an embodiment of the present invention.
Figure 7:
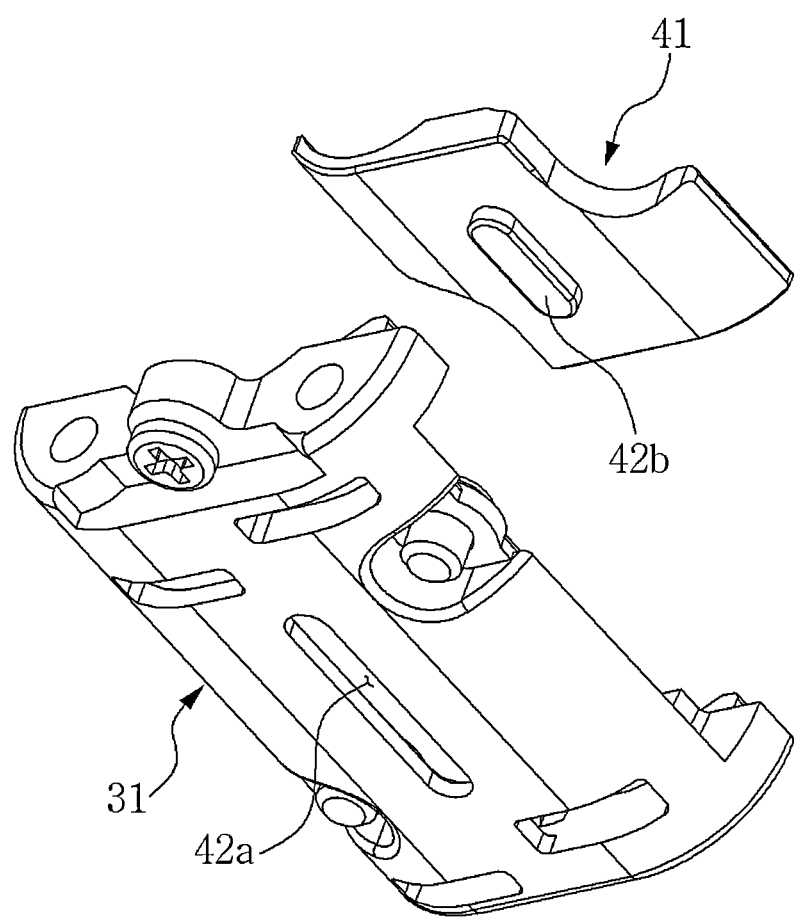
FIG. 7 is an exploded perspective view showing the bottom portions of the housing and the slide member in FIG. 6.

FIGS. 6 and 7 show the first and second hinge blades 21 and 22, the housing 31, and the interlocking means, and a slide member 41 is installed in the housing 31 as an interlocking means for performing a relative motion of the first hinge blade 21 and the second hinge blade 22 with each other.

The slide member 41 is installed in the housing 31 to reciprocate a predetermined distance in the direction of the rotation axis line of the first and second hinge blades 21 and 22 (hereinafter, referred to as 'hinge axis line').

The moving structure of the slide member 41 is accomplished by forming a rectangular slide slot 42a in the housing 31 in the direction of hinge axis line, and forming a slide protrusion 42b inserted and guided in the slide slot 42a on the bottom surface of the slide member 41.

In addition, the interlocking means includes first and second inclined guide protrusions 43a and 43b formed on the bottom surfaces of the first and second hinge blades 21 and 22, and first and second inclined guide grooves 44a and 44b formed on the top surface of the slide member 41 in correspondence thereto. The portions where the first and second inclined guide protrusions 43a and 43b are formed on the bottom surfaces of the first and second hinge blades 21 and 22 are formed in the shape of a curved surface in the rotation direction of the first and second bodies 11 and 12. In addition, it is preferable that the portions in the slide member 41, where the first and second inclined guide grooves 44a and 44b are formed, are also formed in the shape of a curved surface along the length in correspondence to the portions where the first and second inclined guide protrusions 43a and 43b are formed.

The first and second inclined guide grooves 44a and 44b formed on the top surface of the slide member 41 are formed inclinedly in a direction crossing each other with respect to the moving direction of the slide member 41. That is, the first inclined guide groove 44a and the second inclined guide groove 44b are formed to be tilted in the diagonal directions with respect to the moving direction of the slide member 41, and the tilted directions (diagonal directions) are not the same direction as each other, but the crossing directions to each other.

At this point, the tilted angles of the first inclined guide groove 44a and the second inclined guide groove 44b are preferably the same on the basis of the moving axis line of the slide member 41. Accordingly, as the rotational moving distances of the first inclined guide protrusion 43a and the second inclined guide protrusion 43b according to the linear movement of the slide member 41 are the same, when the first and second hinge blades 21 and 22 are interlocked and rotationally move between the 'unfolded position' and the 'folded position', they may rotationally move the same distance.

The first and second inclined guide protrusions 43a and 43b moving while being engaged with the first and second inclined guide grooves 44a and 44b are formed at corresponding positions on the bottom surfaces of the first and second hinge blades 21 and 22. The first and second inclined guide protrusions 43a and 43b may be formed in a hemispherical or rectangular shape. The first and second inclined guide protrusions 43a and 43b are preferably formed in a shape of which the width decreases toward the top, and therefore, vibration and noise can be reduced as friction is reduced when they are engaged with the first and second inclined guide grooves 44a and 44b.

As the first and second inclined guide protrusions 43a and 43b move diagonally along the curved surface in the directions offset from each other along the first and second inclined guide grooves 44a and 44b in association with the linear movement of the slide member 41 in this way, the first and second hinge blades 21 and 22 on which the first and second inclined guide protrusions 43a and 43b are formed are interlocked with each other and rotate between the 'unfolded position' and the 'folded position'.

In addition, in the interlocking structure of the first and second hinge blades 21 and 22, although only any one of the first and second hinge blades 21 and 22 rotates to the 'folded position' or 'unfolded position', as the first and second inclined guide protrusions 43a and 43b move while being engaged with the first and second inclined guide grooves 44a and 44b, and the slide member 41 interlocked with this moves linearly as much as a predetermined length in the direction of hinge axis line, the other side performs a relative motion in the opposite direction and rotates to the 'folded position' or 'unfolded position' at the same time.

FIGS. 9 to 12 are views showing a tension mechanism 50 according to an embodiment of the present invention.

Figure 9:
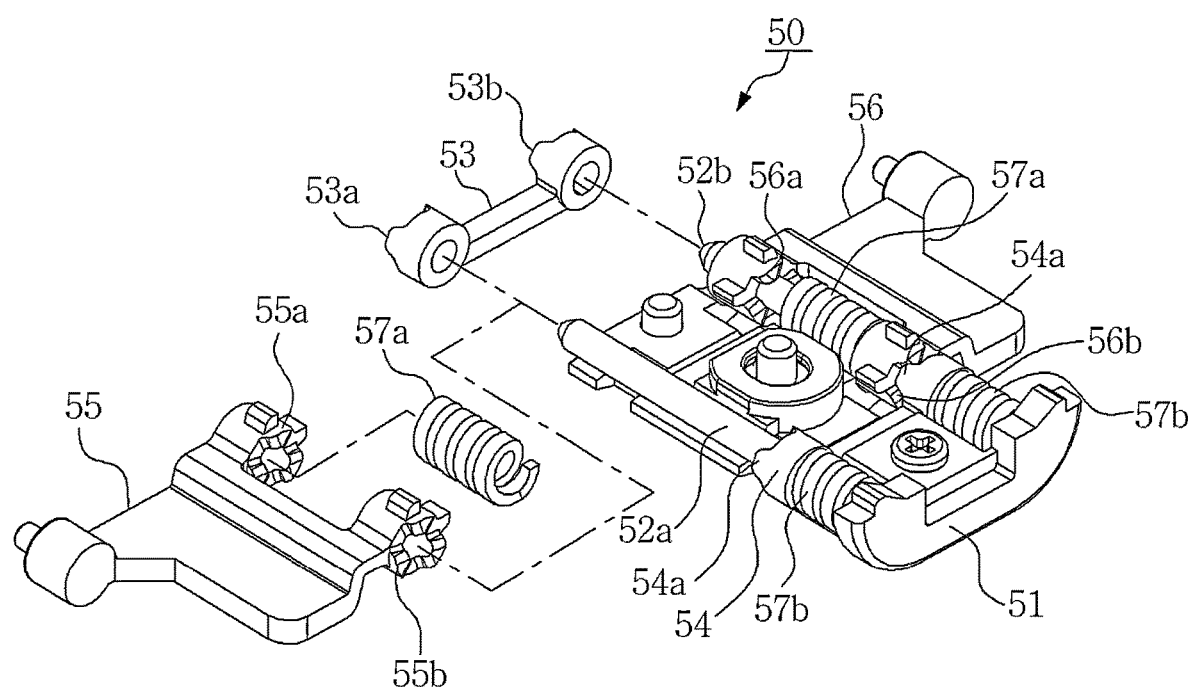
FIG. 9 is a partially exploded perspective view showing the tension mechanism in a hinge device according to an embodiment of the present invention.

As shown in FIG. 9, the tension mechanism 50 according to an embodiment of the present invention is provided with a tension fixed member 51 fixed to the hinge cover 32 (see FIG. 3), and first and second guide shafts 52a and 52b are provided in the tension fixed member 51 in the direction of hinge axis line. Tension operating members 53 and 54 are installed to be inserted into the first and second guide shafts 52a and 52b to be movable in the axis direction, and a plurality of inclined protrusions 53a, 53b, 54a and 54b is formed in the tension operating members 53 and 54 in the circumferential direction around the first and second guide shafts 52a and 52b to protrude in the direction of hinge axis line.

In addition, the tension mechanism 50 includes first and second tension blades 55 and 56 installed to be inserted into the first and second guide shafts 52a and 52b to be rotationally supported and to be movable in the axis direction. Other inclined protrusions 55a, 56a, 55b, and 56b that can be insert-fitted between the inclined protrusions 53a, 53b, 54a, and 54b of the tension operating members 53 and 54 in correspondence thereto are formed in the first and second tension blades 55 and 56.

A first spring 57a is installed as an elastic member between the tension operating member 53 and the rear surfaces of the inclined protrusions 55b and 56b of the first and second tension blades 55 and 56, and a second spring 57b is elastically installed as an elastic member between the tension operating member 54 and the tension fixed member 51. The first and second springs 57a and 57b are installed to always provide elastic force in the direction of insert-fitting the inclined protrusions 53a, 53b, 54a, and 54b of the tension operating members 53 and 54 into the inclined protrusions 55a, 56a, 55b, and 56b of the first and second tension blades 55 and 56.

Figure 10:
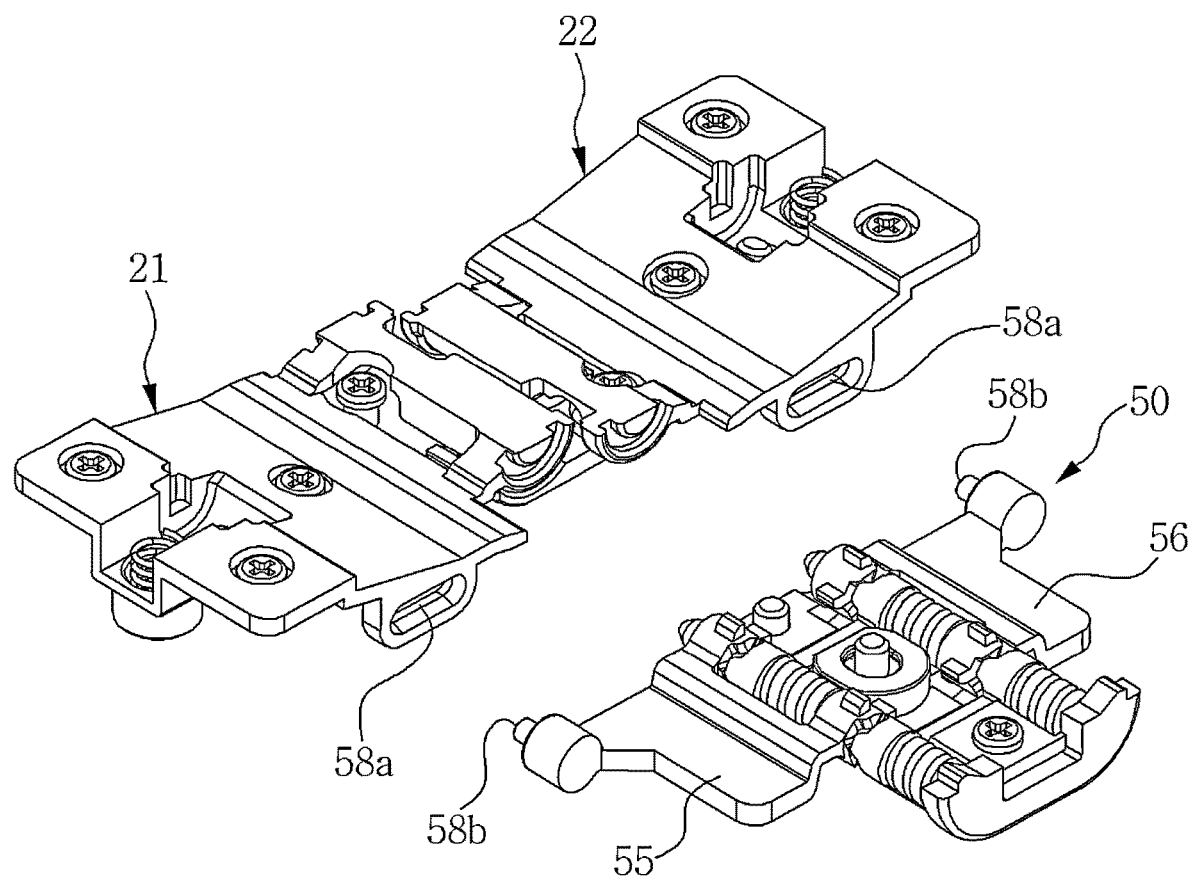
FIG. 10 is a perspective view showing the connection configuration of the tension mechanism and the first and second hinge blades of FIG. 9.

FIG. 10 is a view showing the connection configuration of the tension mechanism 50 and the first and second hinge blades 21 and 22, and the connection configuration is accomplished by forming a rectangular tension guide hole 58a on one side of each of the first and second hinge blades 21 and 22, and forming a tension guide protrusion 58b on each of the first and second tension blades 55 and 56 of the tension mechanism 50 to be slidably inserted and guided in the tension guide hole 58a.

Accordingly, the first and second tension blades 55 and 56 of the tension mechanism 50 rotate between the 'unfolded position' and the 'folded position' in connection with the first and second hinge blades 21 and 22. At this point, as the tension guide protrusions 58b formed on the first and second tension blades 55 and 56 rotating around the fixed first and second guide shafts 52a and 52b slidingly move in the rectangular tension guide holes 58a formed in the first and second hinge blades 21 and 22, the first and second tension blades 55 and 56 may rotate in connection with the first and second hinge blades 21 and 22, of which the positions change with respect to each other, when rotating between the 'unfolded position' and 'folded position'.

Figure 13A:
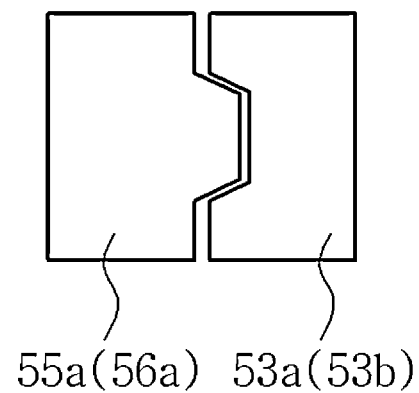
FIGS. 13a and 13b are operation state views showing the tension mechanism in a hinge device according to an embodiment of the present invention.

As the inclined protrusions 55a, 56a, 55b, and 56b of the first and second tension blades 55 and 56 are insert-fitted to or separated from the inclined protrusions 53a, 53b, 54a, and 54b of the tension operating members 53 and 54 according to rotation of the first and second tension blades 55 and 56 (see FIGS. 13a and 13b), and therefore, elastic force of the first and second springs 57a and 57b is increased or decreased, the tension mechanism 50 performs handling of rotation of the first and second bodies 11 and 12 with a small force at the 'unfolded position' or 'folded position', and performs a free stop function between the 'unfolded position' and the 'folded position'.

The free stop function means that when the rotation is stopped by removing the rotational force while rotating the first and second bodies 11 and 12 to the 'unfolded position' or 'folded position', the first and second bodies 11 and 12 stay as they are at the positions where the rotation is stopped.

When the maximum curved portions of the inclined protrusions 53a, 53b, 54a, and 54b of the tension operating members 53 and 54 and the maximum curved portions of the inclined protrusions 55a, 56a, 55b, and 56b of the first and second tension blades 55 and 56 come to a position facing each other according to the rotation of the first and second tension blades 55 and 56, the first and second springs 57a and 57b are compressed so that through the compressed elastic forces, the free-stop function is performed to allow the first and second bodies 11 and 12 to be kept at the positions where the rotations are stopped. (see FIGS. 13a and 13b)

Figure 11:
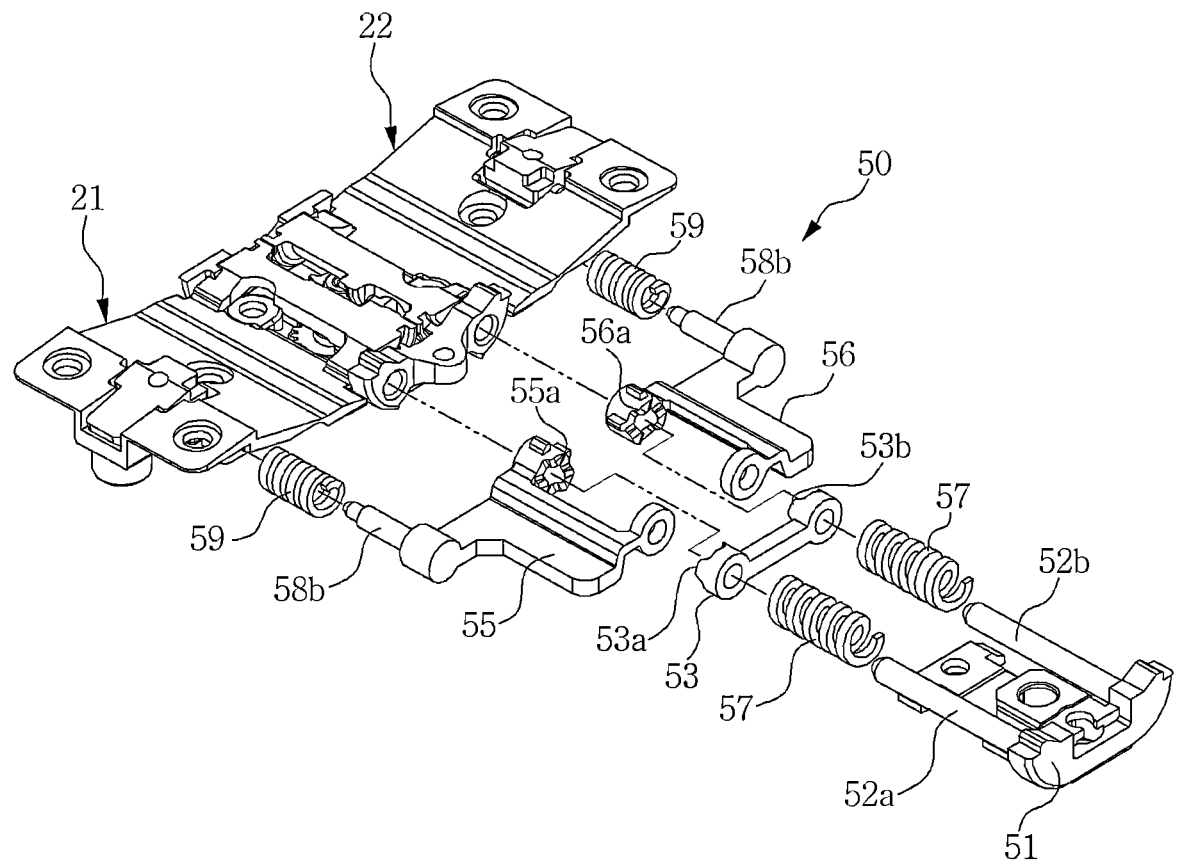
FIG. 11 is a partially exploded perspective view showing the tension mechanism in a hinge device according to another embodiment of the present invention.
Figure 12:
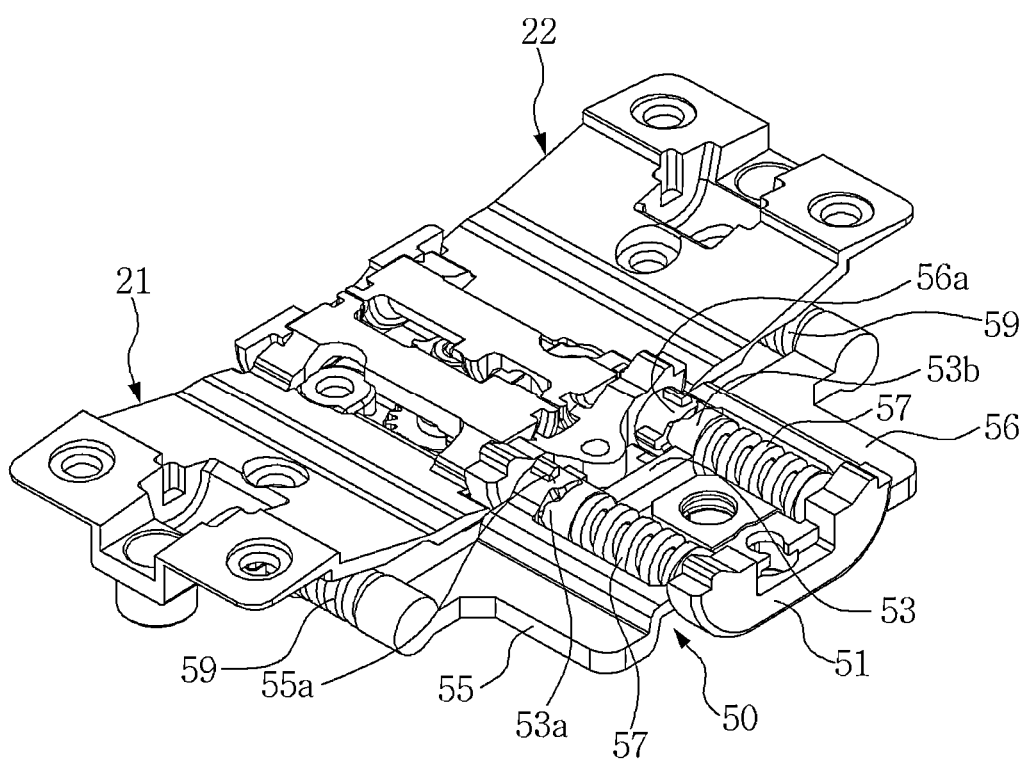
FIG. 12 is a perspective view showing the tension mechanism of FIG. 11 coupled to the first and second hinge blades.

FIGS. 11 and 12 are views showing a tension mechanism in a hinge device according to another embodiment of the present invention. Unlike the tension mechanism shown in FIG. 9, the tension mechanism shown in FIG. 11 has only one spring 57 installed between the tension operating member 53 and the tension fixed member 51 and may extend the distance between the hinge devices on both sides. Therefore, it easy to install signal lines, and as the configuration of the hinge device is simplified, it is easy to assemble, and durability can be improved. In addition, another spring 59 may be installed to be inserted into each of the tension guide protrusions 58b of the first and second tension blades 55 and 56 as an elastic member and elastically adhere to the first and second hinge blades 21 and 22 and the first and second tension blades 55 and 56. Therefore, as another spring 59 is installed at the interlocking portion located farthest from the rotation axis line of the first and second tension blades 55 and 56, the spring force with respect to the rotation torque of the first and second tension blades 55 and 56 can be further increased compared to the case of successively installing the springs on the rotation axis line, and stability and durability can be improved by distributing the spring force concentrated on the rotation axis line.

Although an embodiment of the tension mechanism 50 has been described above, any configuration that can easily handle rotation of the bodies 11 and 12 with a small force and perform the free stop function may be applied to the present invention in combination with the interlocking means described above.

The operation of the hinge device according to the present invention configured as described above will be described below.

When the first and second bodies 11 and 12 are moved between the 'unfolded position' and the 'folded position', as the semicircular grooves 21a and 22a of the first and second hinge blades 21 and 22 respectively fixed to the first and second bodies 11 and 12 are guided to the semicircular protrusions 31a and 31b of the housing 31 to rotationally support as shown in FIGS. 5a and 5b, the operation of moving the first and second bodies 11 and 12 from the 'unfolded position' to the 'folded position' is performed smoothly.

In addition, when only any one of the first body 11 and the second body 12 rotates, the other one performs a relative motion by the interlocking means to rotate together.

Figure 8A:
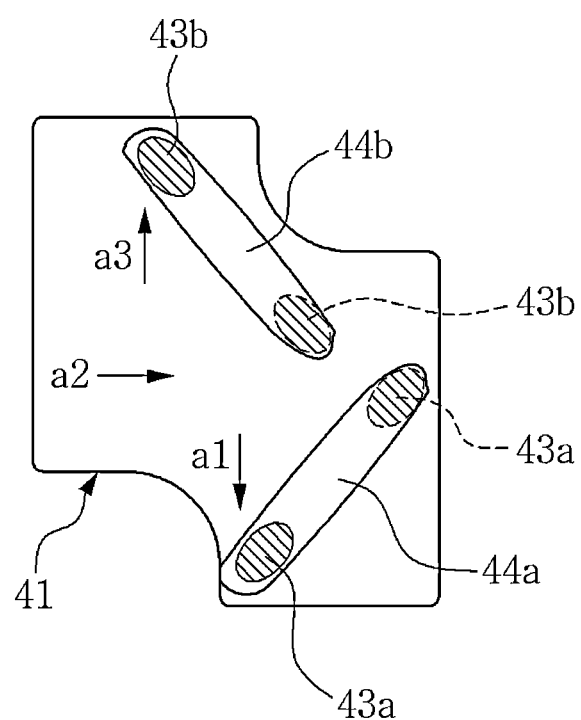
FIGS. 8a and 8b are operation state views showing the interlocking operation of the slide member and the hinge blades in a hinge device according to an embodiment of the present invention.

That is, when the inclined guide protrusion 43a of the first hinge blade 21 moves in the direction of arrow 'a1' in the state of an imaginary line as shown in FIG. 8a by rotating only the first hinge blade 21 to the 'folded position', the slide member 41 moves in the direction of arrow 'a2' by the first inclined guide groove 44a, and the inclined guide protrusion 43b of the second hinge blade 22 is guided by the second inclined guide groove 44b and moves in the direction of arrow 'a3' in the state of an imaginary line, and therefore, the second hinge blade 22 is also moved to the 'folded position' together with the first hinge blade 21.

On the contrary, although the inclined guide protrusion 43b of the second hinge blade 22 is moved in the direction of arrow 'a3', the inclined guide protrusion 43a of the first hinge blade 21 moves in the direction of arrow 'a1' by the first and second inclined guide grooves 44a and 44b of the slide member 41, and therefore, the first hinge blades 21 may be interlocked.

In the same manner, when the inclined guide protrusion 43a of the first hinge blade 21 moves in the direction of arrow 'b1' in the state of an imaginary line as shown in FIG. 10b by rotating only the first hinge blade 21 to the 'unfolded position', the slide member 41 moves in the direction of arrow 'b2' by the first inclined guide groove 44a, and the inclined guide protrusion 43b of the second hinge blade 22 is guided by the second inclined guide groove 44b and moves in the direction of arrow 'b3' in the state of an imaginary line, and therefore, the second hinge blade 22 is also interlocked to the 'unfolded position' together with the first hinge blade 21.

On the contrary, although the inclined guide protrusion 43b of the second hinge blade 22 is moved in the direction of arrow 'b3', the inclined guide protrusion 43a of the first hinge blade 21 moves in the direction of arrow 'b1' by the first and second inclined guide grooves 44a and 44b of the slide member 41, and therefore, the first hinge blades 21 may be interlocked.

Figure 8B:
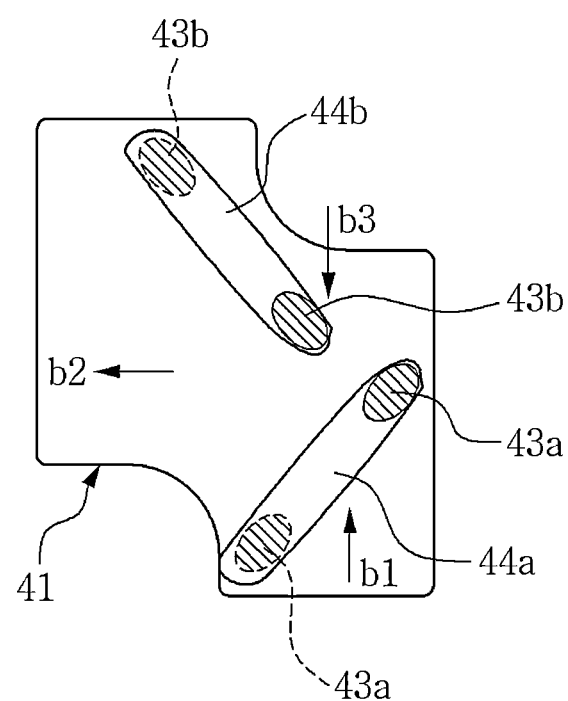

In FIGS. 8a and 8b, the first and second inclined guide protrusions 43a and 43b appear to move diagonally while being engaged with the first and second inclined guide grooves 44a and 44b formed on the slide member 41, and as the interlocked slide member 41 performs a linear movement in the direction of hinge axis line, the first and second hinge blades 21 and 22, on which the first and second inclined guide protrusions 43a and 43b are formed, linearly move up and down (a1 and b1 directions and a3 and b3 directions) on the plan view as a result. However, as the first and second inclined guide grooves 44a and 44b are formed as curved surfaces along the length, and the portions where the first and second inclined guide protrusions 43a and 43b are formed are also formed as curved surfaces in the rotation direction, the first and second hinge blades 21 and 22, on which the first and second inclined guide grooves 44a and 44b are formed, perform rotation movement to the 'folded position' or 'unfolded position' as a result.

In addition, the hinge device 14 of the present invention performs a free stop function by the tension mechanism 50 when the rotation positions of the first and second bodies 11 and 12 are between the 'unfolded position' and the 'folded position'.

In the tension mechanism 50, as the tension guide protrusions 58b of the first and second tension blades 55 and 56 are guided to the tension guide holes 58a of the first and second hinge blades 21 and 22 as shown in FIGS. 9 and 10, when the first and second hinge blades 21 and 22 rotate, the first and second tension blades 55 and 56 are interlocked and rotate together.

Therefore, when the first and second hinge blades 21 and 22 are in the 'folded position' or 'unfolded position', the inclined protrusions 55a, 56a, 55b, and 56b of the first and second tension blades 55 and 56 are insert-fitted between the inclined protrusions 53a, 53b, 54a, and 54b of the tension operating members 53 and 54 (see FIG. 13a), and the first and second springs 57a and 57b are in an extended state. Accordingly, as the elastic force of the first and second springs 57a and 57b that press the first and second hinge blades 21 and 22 in the direction of hinge axis line is reduced, handling of rotation of the first and second hinge blades 21 and 22 can be easily performed with a small force.

Figure 13B:
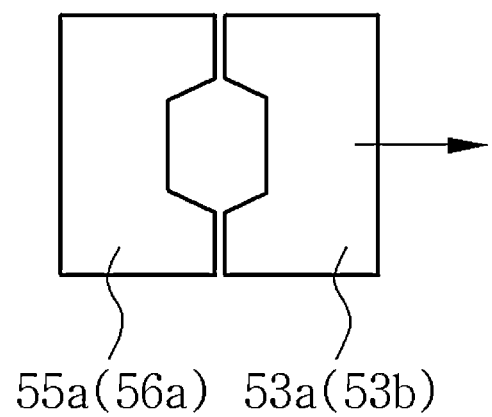

In addition, when the first and second hinge blades 21 and 22 are between the 'folded position' and the 'unfolded position', the inclined protrusions 55a, 56a, 55b, and 56b of the first and second tension blades 55 and 56 are separated from the inclined protrusions 53a, 53b, 54a, and 54b of the tension operating members 53 and 54 by the rotation of the first and second tension blades 55 and 56, and press the tension operating members 53 and 54 to move in the direction of hinge axis line (see FIG. 13b).

Therefore, as the tension operating members 53 and 54 move along the first and second guide shafts 52a and 52b and compress the first and second springs 57a and 57b, the elastic force of the first and second springs 57a and 57b that press the tension operating members 53 and 54 toward the first and second tension blades 55 and 56 is increased, and a free stop function of maintaining the first and second bodies 11 and 12 as they are at a stopped position may be performed using the increased elastic force when the first and second bodies 11 and 12 are stopped during rotation.

The free stop function described above may be explained in the same way in the tension mechanism 50 according to another embodiment of the present invention shown in FIGS. 11 and 12.

The hinge device of the present invention described above in detail may be used in various devices to which a foldable hinge structure is applied, such as a notebook computer or the like, in addition to portable terminals such as cellular phones.

As described above, optimal embodiments are disclosed in the drawings and specifications. Although specific terms are used herein, they are used only for the purpose of describing the present invention and are not used to limit the meaning or scope of the present invention described in the claims. Therefore, those skilled in the art will understand that various modifications and other equivalent embodiments are possible therefrom. Accordingly, the true technical protection scope of the present invention should be determined by the technical spirit of the attached patent claims.

The invention claimed is:

1. A hinge device comprising: a housing positioned between one-end portions of a first body and a second body; a first hinge blade and a second hinge blade fixed to the first body and the second body and rotationally supported on the housing to perform rotation movement, along a first and second guide shafts respectively, as much as a predetermined angle between an 'unfolded position' at which the first body and the second body are placed on the same horizontal line and a 'folded position' at which the first body and the second body are facing and in contact with each other; and a slide member for interlocking the first hinge blade and the second hinge blade to perform a relative motion, wherein a first inclined guide protrusion and a second inclined guide protrusion are formed on bottom surfaces of the first hinge blade and the second hinge blade, a first inclined guide groove and a second inclined guide groove are formed on a top surface of the slide member in correspondence thereto, and the slide member is installed in the housing to reciprocate a predetermined distance in a direction of hinge axis line parallel to the first and second guide shafts; and a length direction of each of the first inclined guide groove and the second inclined guide groove is formed inclinedly in a direction crossing each other with respect to the moving direction of the slide member; and tilted angles of the length directions of the first inclined guide groove and the second inclined guide groove are the same on the basis of a moving axis line of the slide member when the first and second hinge blades are rotated between the unfolded and folded positions.

2. The hinge device according to claim 1, wherein the first inclined guide groove and the second inclined guide groove are configured as a curved surface formed in a rotation direction along a length.

3. The hinge device according to claim 1, wherein the portions where the first inclined guide protrusion and the second inclined guide protrusion are formed are configured as a curved surface formed in a rotation direction.

4. The hinge device according to claim 1, wherein a rectangular slide slot is formed in the housing in a moving direction of the slide member, and a slide protrusion inserted and guided in the slide slot is formed on the slide member.

5. The hinge device according to claim 1, wherein the first inclined guide protrusion and the second inclined guide protrusion are formed in a shape of which a width decreases toward a top.

6. The hinge device according to claim 1, wherein the first inclined guide protrusion and the second inclined guide protrusion are formed in a rectangular shape in a length direction of the first inclined guide groove and the second inclined guide groove.

7. The hinge device according to claim 1, wherein the first inclined guide protrusion and the second inclined guide protrusion are formed in a hemispherical shape.

8. The hinge device according to claim 1, wherein the hinge device is rotationally supported by configuring a pair of semicircular protrusions formed on both inner walls of the housing, and semicircular grooves formed on the first and second hinge blades, into which the semicircular protrusions are insert-fitted to be rotationally supported.

9. The hinge device according to claim 8, wherein the pair of semicircular protrusions are formed to be spaced a predetermined distance apart to accommodate a predetermined radius of curvature formed in a folding portion of a flexible display panel at the 'folding position'.

10. The hinge device according to claim 1, further comprising a tension mechanism comprising:
a tension fixed member having a first guide shaft and a second guide shaft in a direction of hinge axis line;
a first tension blade and a second tension blade installed to be inserted into the first guide shaft and the second guide shaft to be rotationally supported and to be movable in an axis direction;
tension operating members installed to be inserted into the first guide shaft and the second guide shaft to be movable in the axis direction; and
a spring that provides elastic force to the tension operating member.

11. The hinge device according to claim 10, wherein the tension mechanism includes a plurality of inclined protrusions formed in the tension operating members in a circumferential direction around the first guide shaft and the second guide shaft, and another plurality of inclined protrusions formed in the first tension blade and the second tension blade to be insert-fitted in correspondence to the inclined protrusions.

12. The hinge device according to claim 10, wherein the tension mechanism includes a tension guide protrusion provided in each of the first tension blade and the second tension blade, wherein the tension guide protrusion is inserted and guided in a rectangular tension guide hole formed on one side of each of the first and second hinge blades.

13. The hinge device according to claim 10, wherein the tension mechanism further includes a spring elastically installed at an interlocking portion located farthest from the rotation axis line of the first and second tension blades, between the interlocking portions of the first and second hinge blades and the first and second tension blades.

* * * * *